Figure 1:
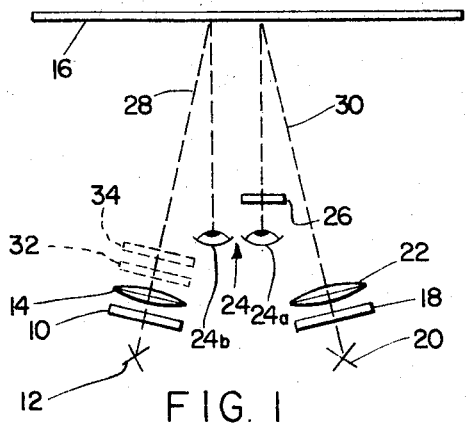

April 21, 1970     E. H. LAND     3,507,549

METHOD FOR PRODUCING AND VIEWING COMPOSITE IMAGES

Filed Sept. 15, 1961

INVENTOR.
Edwin H. Land
BY Brown and Mikulka
Attorneys

United States Patent Office

3,507,549
Patented Apr. 21, 1970

3,507,549
METHOD FOR PRODUCING AND VIEWING
COMPOSITE IMAGES
Edwin H. Land, Cambridge, Mass., assignor to Polaroid
Corporation, Cambridge, Mass., a corporation of Delaware
Filed Sept. 15, 1961, Ser. No. 138,342
Int. Cl. G02b 27/22
U.S. Cl. 350—132       7 Claims This invention relates to the formation of composite images and more particularly to novel methods and systems for producing and viewing stereoscopic images, either in black-and-white or in color.

The present invention involves several striking and advantageous departures from conventional methods of forming and viewing images, in particular stereoscopic images. It also embodies a novel and useful concept of color imagery. Thus, for example, the present invention comprehends a stereo system in which but a single filter element, positioned in front of one eye, only, of the viewer is required to produce a full stereoscopic effect. The foregoing system also permits a two-dimensional image of the subject to be seen by simply removing the filter. This permits a rapid comparison of a "flat" picture of a given subject with one in "depth." It also comprehends novel systems for producing three-dimensional images in full color employing monocular or binocular viewing devices other than light polarizers.

One particular embodiment of the invention utilizes three color-separation components viewed by one eye and one black-and-white component viewed by the other eye. Thus it is a significant finding of the present invention, and one having practical application in certain of the systems described herein, especially with respect to stereoscopic systems thus described, that all of the color information of a composite image, having both color and black-and-white image components, can be perceived by one eye of the viewer only, while the other eye perceives substantially exclusively the non-colored image components.

In accordance with the foregoing considerations, objects of the invention are to provide improved stereoscopic methods and systems from the point of view of an enlarged utility, taken with aspects of greater simplicity and economy; to provide novel and improved methods and systems of forming multicolor images; to provide stereoscopic multicolor images through novel additive or subtractive methods and devices; and to provide methods and systems of the character described which are adapted either to front or rear image projection, including television, and to the production of direct viewing adaptations including both transparencies and reflection prints.

Other objects of the invention will in part be obvious and will in part appear hereinafter.

The invention accordingly comprises the processes and systems involving the several steps and the relation and order of one or more of such steps with respect to each of the others which are exemplified in the following detailed disclosure, and the scope of the application of which will be indicated in the claims.

Figure 4:
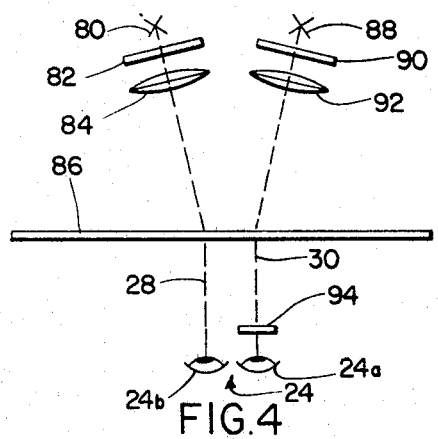
Figure 5:
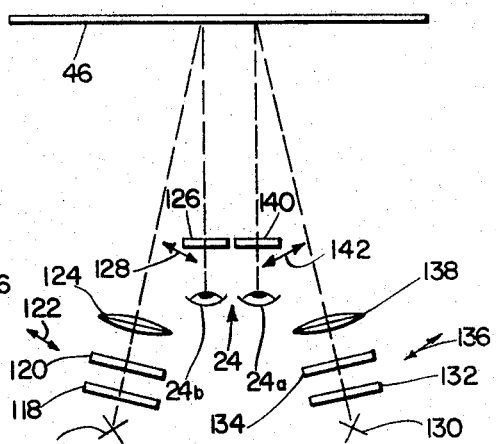
Figure 6:
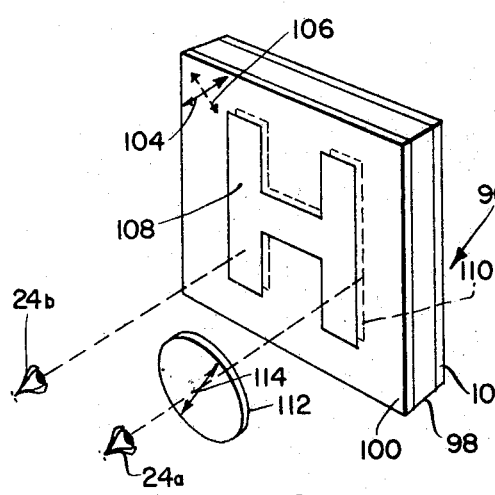

For a fuller understanding of the nature and objects of the invention, reference should be had to the following detailed description taken in connection with the accompanying drawing wherein:

FIGURES 1 through 5 are diagrammatic views of projection systems of the invention; and FIG. 6 is a diagrammatic perspective view of a composite print further exemplifying the invention.

Referring to FIG. 1, there is shown one embodiment of the invention in which a transparency 10 is projected by light-source means 12 and lens means 14 onto a screen 16 and a second and different transparency 18 is similarly projected by light-source means 20 and lens means 22. The images are viewed at 24, a filter, e.g., a monocle 26, worn by the viewer being located in the path of reflected light rays identified with transparency 18. While the optical axes 28 and 30 of the two projection devices are shown quite widely spaced at their points of incidence upon screen 16, it is to be understood that, actually, the images would generally be substantially superimposed in producing a non-stereoscopic image deriving color components from each transparency, and would be offset laterally, but to a lesser degree, relatively, than that shown, in the instance of a stereoscopic system where transparencies 10 and 18 are left- and right-eye stereoscopic images, respectively. The exaggerated lateral displacement of the optical axes at screen 16, as well as the directions thereof from the screen to the eyes of the viewer at 24, shown in FIGS. 1 through 4 are not intended to designate the paths of image-forming light rays but are primarily for the purpose of providing a distinct separation of the two paths of light so that a viewing filter or filters can be included in one or both paths for illustrative purposes. It is, of course, evident that such additional components, not shown, as reflectors, condensing lenses, and additional objective elements etc., would be included in the system for image-forming purposes.

Assuming FIG. 1 to represent a stereoscopic system, in one embodiment thereof, transparency 10 comprises a left-eye full-color image, formed, for example, of cyan, magenta and yellow color-separation image components operating subtractively to provide a multicolor image, or of red, green, and blue screen components operating additively. Alternatively, element 10 may represent a single color-separation transparency, e.g., the red color-separation record used with a red filter 32, the green and blue records having associated green and blue filters, not shown, being separately projected from individual projectors, also not shown. Element 12 is a source of substantially white light or white light minus light of the sodium band. Transparency 18 is a right-eye black-and-white image projected by illumination means which is dark relative to the illumination provided along axis 28 and element 20 is a sodium light source. The viewing element 26 is a narrow band, yellow filter or monocle. Assuming the color transparency 10 to be composed of color components, e.g., red, green and blue, color components, so chosen as to their composition as not to pass sodium light, and viewing filter 26 to be a narrow band, yellow filter, the right eye 24a sees only the right-eye projection image of the black-and-white transparency 18. Simultaneously, the left eye sees substantially only the left-eye projection image of the color transparency 18 by reason of the chosen relative darkness of illumination of the black-and-white image which effectively "disappears" when viewed in superimposed relation with the color image for lack of contrast with the latter. One special advantage of this system derives from the fact that when the eye focuses on a full-color picture, it focuses essentially at the same place as it would when viewing a picture in yellow light. Consequently, in the foregoing system, the eye viewing the full-color picture and the eye viewing the picture in sodium light are both essentially at the same focus. A satisfactory ratio of brightnesses, between the black-and-white and color image components, is provided when the black-and-white image component is accorded approximately 5 to 30% of the brightness of the color image component or components.

Further referring to FIG. 1, where certain color components of the left-eye transparency 10 might undesirably, be visible through the narrow-band, yellow, right-eye viewing filter 26, depending upon the width of the band of the latter, a filter 34 such as one containing a didymium compound adapted to absorb light of the sodium line portions of the spectrum is introduced in the projection path of the optical axis 28 to prevent perception of said color components by the right eye. Appropriate filters for the purpose are No. 1–60 or No. 1–63 didymium filters manufactured by Corning Glass Works, Corning, N.Y., U.S.A. Filter 26 is chosen to pass light of approximately 589 millimicrons. When filter 26 is removed from its functional position, a two-dimensional multicolor image of transparency 10 is seen, the relatively dark image of transparency 18 being substantially invisible against the multicolored image.

As will be apparent, the system of FIG. 1 is not limited to a stereoscopic function, it being adapted to any use where it may be desirable to render components of light selectively visible to each eye of the viewer as, for example, to restrict the visibility of color components of a multicolored image to one eye of the viewer while a neutral-toned component thereof is limited in visibility to the other eye. In a modification of the system of FIG. 1, the light source 12 may be chosen to produce light of the visible spectrum exclusive of the ends, and the light source 20 to produce light at the red and blue ends of the spectrum. In such an instance, filter 26 would be of a magenta color.

Figure 2:
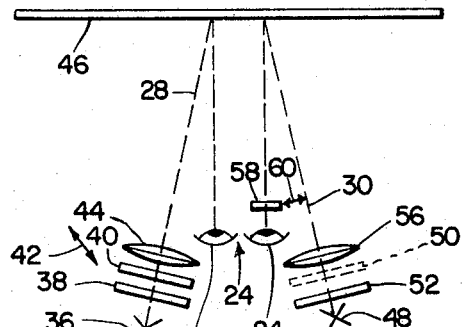

A further modification of the system, above described, and employing light-polarizing means for image selection purposes, is shown in FIG. 2. It comprises a substantially white light source 36, a left-eye full-color transparency 38, a light-polarizing filter 40 having a polarizing direction 42, a projection lens or objective 44, a non-depolarizing screen 46, a light source 48 producing, of itself or in conjunction with a neutral density filter 50, relatively dark illumination, a right-eye black-and-white transparency 52, an objective 56, and a light-polarizing monocular filter or analyzer 58 having a polarizing direction 60 located adjacent to the right eye 24a of the viewer.

In operation, the right eye 24a sees the image of transparency 52 substantially exclusively by reason of the crossed relationship of polarizing axes 42 and 60. The left eye sees only the multicolored image of transparency 38 because of the relatively dark illumination provided along axis 30 whereby the image of transparency 52 is substantially invisible against the multicolored image. Filter 58 may be removed from its functional position enabling the viewer to see a two-dimensional multi-colored image. The transparency 38 may be in any of the alternative color-providing forms described hereinbefore relative to FIG. 1. It may also, of itself, be a light-polarizing image such as one rendered in a dichroic dye and printed on a molecularly oriented film, thus obviating the need for the separate polarizing element 40.

Figure 3:
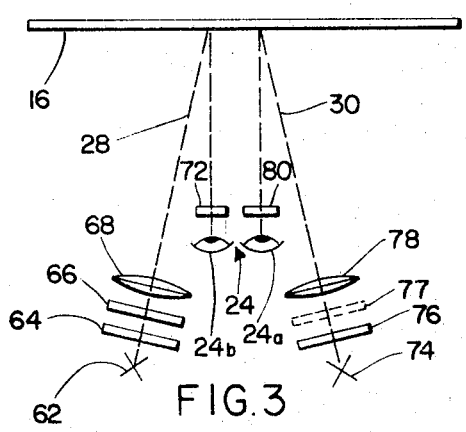

In FIG. 3, there is illustrated a stereoscopic system comprising a source of substantially white light exclusive of that of the sodium band 62, a left-eye full-color transparency 64, a didymium filter 66, an objective 68, a projection screen 16, a left-eye didymium, viewing filter 72, a source of sodium light 74, a right-eye black-and-white transparency 76, an objective 78, and a right-eye, narrow band, yellow viewing filter 80. The multicolor image is carried on one band, namely, substantially the visible spectrum exclusive of light of the sodium line, and the black-and-white image is carried on another band, that is, by sodium light. The didymium viewing filter 72 passes the multicolor image light rays from transparency 64 but blocks those from the source of sodium light 74. The narrow band, yellow viewing filter 80 passes the black-and-white image light rays but blocks those from light source 62. Alternatively, a filter 77 adapted to pass the ends of the visible spectrum could be provided and filter 80 modified for a similar purpose. Light source 74 would then be of a type to provide energy for these regions of the spectrum. In accordance therewith, filters 66 and 72 would be modified to pass substantially the entire visible spectrum exclusive of the aforesaid ends.

The system of FIG. 4 illustrates one adapted to the formation of images of the character previously described and, assuming a stereoscopic function, it comprises rear projection means including a source of substantially white light 80, a left-eye full-color transparency 82, an objective 84, a light-transmitting projection screen 86, a source of sodium light 88, a right-eye black-and-white transparency 90 projected by relatively dark illumination, as previously described, and an objective 92. A monocular viewing element 94 in the form of a narrow band, yellow filter is positioned in front of the right eye 24a, the left eye 24b having no filter means in front of it. This system functions in a manner generally similar to that shown in FIG. 1, it being possible to include filters such as 32 and 34 in an optical path of projection 28 of the color image, as previously described.

In FIG. 5, there is shown a light-polarizing stereoscopic system comprising a substantially, white light source 116, a left-eye full-color transparency 118, a light polarizing filter 120 having a polarizing direction 122, an objective 124, a non-depolarizing screen 46, a left-eye viewing filter or analyzer 126 having a polarizing direction 128, a light source 130, a right-eye black-and-white transparency 132, a light-polarizing filter 134 having a polarizing direction 136, and objective 138, and a right-eye viewing filter 140 having a polarizing direction 142. In operation, the right eye 24a sees the image of transparency 132 substantially exclusively because of the parallel relation of polarizing axes 136 and 142 and the crossed relation of polarizing axes 122 and 142. The left eye 24b sees the image of transparency 118 substantially exclusively because of the parallel relation of polarizing axes 122 and 128 and the crossed relation of polarizing axes 136 and 128.

The present invention is further adapted to embodiment in transparencies or reflection prints for direct viewing. One such adaptation employing light-polarizing components is shown in the composite print 96 of FIG. 6. As shown, the structure appears of appreciable thickness but actually it may be a relatively thin sheet having, for example, an overall thickness of as little as .005″. Assuming the print to be in the form of a transparency, it comprises a central light-transmitting support layer 98, a front layer 100 of a material adapted to be rendered light polarizing, such as a molecularly oriented, hydroxyl-containing vinyl polymer bonded to the front surface of support layer 98, and a rear layer 102 of a similar material but molecularly oriented substantially at 90° relative to the front layer. Rear layer 102 is bonded to the rear surface of central layer 98. The light-polarizing directions of layers 100 and 102, when treated with a proper dye, stain or the like, such as a dichroic direct cotton dye, are indicated by the double-headed arrows 104 and 106, respectively. A full-color light-polarizing, left-eye stereoscopic image 108 of the general type described in U.S. Patent No. 2,289,714 and having the polarizing direction 104 is printed in proper dichroic dyes on the front layer 100. A black-and-white light-polarizing, right-eye stereoscopic image 110 of the general type described in U.S. Patent No. 2,373,035 and having the polarizing direction 106 is printed in a dichroic dye or stain on the rear layer 102. A monocular light-polarizing filter or analyzer 112 having the polarizing direction 114 is positioned in front of the right eye 24a, the left eye 24b having no filter. In operation, the right eye sees only the rear black-and-white image 110 having a crossed relation of its polarizing axis. The left eye sees only the front full-color image 108 because the black-and-white image 110 is rendered in a brightness range such that it is substantially invisible against the full-color image 108. With filter 114 removed, both eyes see only the full-color image for a similar reason. By employing a non-depolarizing reflecting layer at the rear of layer 102, a reflection print is provided. If it is desired to provide a print of the type of FIG. 6 incorporating balanced brightnesses of left- and right-eye images, a second viewing filter, having a polarizing direction at 90° to that of filter 112, may be positioned in front of the left eye 24b.

Another form of print employing an additive screen and exemplifying the principles described herein comprises a full-color left-eye stereoscopic image formed in a first set or mosaic of red, green and blue screen components and a "black-and-white" right-eye stereoscopic image formed in a second set or mosaic of yellow screen components interspersed with the first set. The second set of screen components is designed to pass a narrow band of yellow wavelengths and to absorb all other wavelengths. The first set of screen components is designed to absorb at least 80% of the wavelengths passed by the second set of screen components. The "black-and-white" image is taken in such a way that the density of each object is the same in the "black-and-white" image as in the color image, such densities being defined as above. The viewer employs a narrow band, yellow filter over the right eye and a filter which blocks this band of wavelengths, such as a didymium filter, over the left eye. Alternatively, the yellow components of the screen may be such as to pass much less light than the other components. In this case the viewer will see substantially only the colored image emanating from the red, green and blue elements of the screen if the didymium filter is dispensed with, and this may be done.

In an alternative embodiment of this screen technique the full-color image is formed of red, green and blue elements which do not pass the ends of the spectrum, the "black-and-white" image is formed of elements which do pass the ends of the spectrum, and the viewer uses filters which pass, respectively, the whole spectrum apart from the ends, and the ends of the spectrum only.

Several television adaptions of the stereoscopic methods described herein are possible. Thus, for example, the left- and right-eye images may be picked up, transmitted on individual channels, and reproduced on individual sets of phosphors of the target screen of the receiver picture tube. The principles hereinbefore described may be exemplified in a light-polarizing television system, for example, by super-imposing a light-polarizing screen, or screens, with one or a plurality, respectively, of sets of phosphors and employing therewith monocular or binocular viewing means of the character hereinbefore described.

In another television adaptation, the sets of phosphor luminescing in response to electron impingement derived from the left-eye signal may, for example, provide, additively, the full-color ingredients of a multicolored image while the right-eye signal excites luminescence of a set of phosphors producing substantially white light. The phosphor set reproducing the right-eye image is chosen to emit light of a narrow band of yellow wavelength, while the set of phosphors reproducing the left-eye image is chosen to emit light in other regions of the visible spectrum. A right-eye narrow band, yellow filter, passing light of the yellow wavelengths, and a left-eye didymium filter, passing the left-eye colors and blocking the yellow wavelengths, are employed, respectively, therewith for viewing purposes. Other television adaptations employing the principles of multicolor imagery and stereoscopic function described herein will be apparent to one skilled in the art and are deemed to fall within the scope of the present invention.

Where plane light-polarizing means have been shown herein, it is to be understood that circularly light-polarizing means, such as filters, may be employed in combination in a manner known to the art in their stead.

To obtain a proper balance of densities of left- and right-eye images using projection and viewing means of the type herein-before described and the technique of separately projecting three left-eye color-separation prints, with associated red, green and blue filters to superimposition on a screen and a back-and-white right-eye transparency to proper registration therewith, the following preliminary operations were performed. The right-eye color-separation transparency was exposed by an amount equal to one-sixth of that of the left-eye red and two-fifths of the left-eye green color-separation transparencies and one-sixteenth that of the left-eye blue transparency. In projection, it was found that a similar exposure for both left- and right-eye transparencies resulted in retinal rivalry, e.g., with respect to blue objects in the image, using a material with a spectral sensitivity commonly employed. It appeared that the contribution of the blue light to the black-and-white image required diminution. Using a common panchromatic emulsion in conjunction with two Wratten color compensating filters, CC5OY, and one Wratten color compensating filter 30C substantially prevented retinal rivalry. It was also observed that the colors of the composite image, seen by both eyes, seemed to be less saturated than those of the image of the color transparency, when viewed by itself, but more saturated than those of the superimposed color and back-and-white images when viewed by either eye, alone. For best results, it was ascertained that the color transparency should be slightly brighter than the back-and-white transparency and slightly brighter and more saturated than reality. This was achieved by using narrow band interference filters in producing the color-separation prints for the left-eye. In a color process this substantially corresponds to providing sharp peaks of sensitization of emulsions or to exaggerating the undercuts of a subtractive process.

Further referring to the production of full-color stereoscopic images and the reduction of retinal rivalry through methods of the present invention, some latitude is possible within the scope thereof in allocating the color and black-and-white components to the respective left- and right-eye images provided the image for one eye is dark with respect to the image for the other eye and the densities of like objects in both images are substantially similar. Thus, for example, a left-eye transparency may embody two or more color components and an associated right-eye transparency one or more color components. One such arrangement comprises a two-color component image of the left-eye transparency and a different two-color component image of the right-eye transparency.

Where left- and right-eye images have been described herein as identified with certain stated light sources, filters, color-providing means, etc. it will be understood that they can be reversed in their association therewith. Thus, for example, where the full-color image has generally been described as associated with the left eye and associated elements and the black-and-white image with the right eye, an opposite arrangement may, of course, be the case without affecting the operation of the system.

Wherein means such as light polarizers, special light source means, filters, etc., have been described herein for rendering the left- and right-eye images individually perceptible, it is to be understood that such features of the invention as incorporating the color components in an image to be viewed by one eye only and the black-and-white component in an image to be viewed exclusively by the other eye are adapted to be included in entirely separate images to be viewed on a stereoscopic viewer of a classic type, incorporating a septum or the like to separate the images. Although separate projection means are shown for projecting left- and right-eye images, it will be understood that a single projector having beam-splitting means, may, alternately, be used for mounting and projecting separate transparencies. Where the terminology "black-and-white" has been used herein, it is intended to include an image formed in a monochromatic medium or color as, for example, one formed in sodium light.

In a modification, the full-color picture may be printed in subtractive dyes which leak a band of wavelengths in the yellow region of the spectrum and the black-and-white picture printed in a didymium salt or compound. This may be viewed either with a monocular or binocular viewer, the monocular viewer consisting of a narrow band, yellow filter passing those wavelengths which the didymium filter blocks placed over the eye for which the picture printed in didymium was taken, the binocular viewer consisting of the aforesaid yellow filter, together with a didymium filter over the other eye.

Since certain changes may be made in the foregoing methods and systems withou departing from the scope of the invention herein involved, it is intended that all matter contained in the above description or shown in the accompanying drawing shall be interpreted as illustrative and not in a limiting sense.

What is claimed is:

1. The method of providing a composite image visible to both eyes as a single image, but containing separately provided and relatively different left- and right-eye image components, each of which is rendered in visible light, comprising the steps of:

forming a first image component in visible light at an image plane, and forming at said image plane in superposed relationship to said first image component a second image component related to said first image component in visible light of substantially lesser intensity than that of said first image component such that the unaided vision is capable of perceiving substantially only said first image component, the second image component being obscured by the greater intensity of the first image component, the quality of the light employed for the formation of said first and second image components differing essentially by a substantial filterable factor, and interposing before only one eye of a viewer a discriminating filter passing visible light from the second of said image components and blocking light from the first and brightest of said image components to render each of said image components visible to a separate eye of the viewer.

2. The method as defined in claim 1 wherein at least said first image component is formed as a multicolored image rendered in at least three colors.

3. The method as defined in claim 1 wherein the first image component is formed in polarized light and said discriminating filter comprises a crossed light polarizing analyzer.

4. The method of providing a composite image visible to both eyes as a single image, but containing separately provided and relatively different left- and right-eye image components, each of which is rendered in visible light, comprising the steps of:

forming a first image component in visible light at an image plane, and forming at said image plane in superposed relationship to said first image component a second image component related to said first image component in visible light of substantially lesser intensity of from 5% to 30% of said first image component such that the unaided vision is capable of perceiving substantially only said first image component, the second image component being obscured by the greater intensity of the first image component, the quality of the light employed for the formation of said first and second image components differing essentially by a substantial filterable factor, and interposing before only one eye of a viewer a discriminating filter passing visible light from the second of said image components and blocking light from the first and brightest of said image components to render each of said image components visible to a separate eye of the viewer.

5. A system for the formation of composite stereoscopically related images perceptible to the unaided vision as a single two-dimentional image but viewable by means of a monocular discriminating filter as a composite image comprising:

means for forming a first image component in visible light at an image plane, and means for forming at said image plane in superposed relation to said first image component a second image component stereoscopically related to said first image component in visible light which differs by a substantial filterable factor from that employed in the formation of said first image component, one of said image components being so much brighter than the other that it obscures and renders substantially imperceptible to the unaided eye the less bright component, and viewing means including a monocular viewing filter to be positioned before only one eye of an observer for discriminating against the light from the brighter image component and transmitting light from the less bright image component to render each of said image components visible to a separate eye of an observer.

6. A system for forming and viewing stereoscopic images which are nevertheless perceptible to the unaided vision as a single nonstereoscopic image comprising:

image-formation means for forming at an image plane a pair of superposed and stereoscopically related image components both in visible light, one of said image components being rendered in visible light differing in quality from that of the other image comoponent by a principal filterable factor and being so much brighter than that of said other image component that the unaided eye is capable of perceiving substantially only the brighter image component, the less bright image component being substantially obscured by the greater intensity of the brighter image component, and viewing means comprising a monocular discriminating filter to be positioned before only one eye of a viewer for blocking light from the brighter of said image components and transmitting light from the less bright of said image components thereby rendering the less bright image component visible to said one eye, while the other eye of the viewer perceives only the brighter of said image components.

7. A system for forming and viewing stereoscopic images which are nevertheless perceptible to the unaided vision as a single nonstereoscopic image comprising:

image-formation means for forming at an image plane a pair of superposed and stereoscopically related image components both in visible light, one of said image components being rendered in visible light differing in quality from that of the other image component by a principal filterable factor and being between 5% to 30% of the brightness of said other image component such that the unaided eye is capable of perceiving substantially only the brighter image component, the less bright image component being substantially obscured by the greater intensity of the brighter image component, and viewing means comprising a monocular discriminating filter to be positioned before only one eye of a viewer for blocking light from the brighter of said image components and transmitting light from the less bright of said image components thereby rendering the less bright image component visible to said one eye, while the other eye of the viewer perceives only the brighter of said image components.

References Cited

UNITED STATES PATENTS

| | | | |
|---|---|---|---|
| 2,217,907 | 10/1940 | Kampfer et al. | 88—16.4 |
| 2,289,714 | 7/1942 | Land. | |
| 1,931,920 | 10/1933 | Bernardi | 88—16.4 |
| 2,530,023 | 11/1950 | Millais | 88—16.4 |
| 2,854,335 | 9/1958 | Mahler. | |

FOREIGN PATENTS

| | | |
|---|---|---|
| 389,697 | 3/1933 | Great Britain. |
| 694,339 | 7/1954 | Great Britain. |
| 660,994 | 11/1951 | Great Britain. |

DAVID H. RUBIN, Primary Examiner

U.S. Cl. X.R.

350—153, 320